United States Patent
D'Andreta

(10) Patent No.: US 10,105,727 B2
(45) Date of Patent: Oct. 23, 2018

(54) APPARATUS FOR PREVENTING A COVER FROM BEING DRAWN INTO AN AXIS JOINT OF A PAINT ROBOT AND RELATED METHOD

(71) Applicant: Mark D'Andreta, Brandon Township, MI (US)

(72) Inventor: Mark D'Andreta, Brandon Township, MI (US)

(73) Assignee: TD INDUSTRIAL COVERINGS, INC., Sterling Heights, MI (US)

( * ) Notice: Subject to any disclaimer, the term of this patent is extended or adjusted under 35 U.S.C. 154(b) by 599 days.

(21) Appl. No.: 14/151,050

(22) Filed: Jan. 9, 2014

(65) Prior Publication Data

US 2014/0216334 A1    Aug. 7, 2014

Related U.S. Application Data

(60) Provisional application No. 61/750,598, filed on Jan. 9, 2013.

(51) Int. Cl.
| | |
|---|---|
| *B05B 13/02* | (2006.01) |
| *B05B 15/50* | (2018.01) |
| *B05B 13/04* | (2006.01) |
| *B05C 1/06* | (2006.01) |
| *B25J 19/00* | (2006.01) |

(52) U.S. Cl.
CPC ............. *B05B 15/50* (2018.02); *B05B 13/02* (2013.01); *B05B 13/0431* (2013.01); *B05C 1/06* (2013.01); *B25J 19/0075* (2013.01); *Y10S 901/43* (2013.01); *Y10S 901/49* (2013.01); *Y10T 24/44248* (2015.01); *Y10T 29/49826* (2015.01)

(58) Field of Classification Search
CPC . B05B 13/0431; B05B 15/04; B05B 15/0437; B05B 15/045; B05B 15/0487
See application file for complete search history.

(56) References Cited

U.S. PATENT DOCUMENTS

| | | | | |
|---|---|---|---|---|
| 6,082,290 | A * | 7/2000 | Conlin | ................ B05B 13/0431 118/326 |
| 6,543,307 | B2 * | 4/2003 | Ambrose | ............. B25J 19/0025 74/490.01 |
| D491,964 | S | 6/2004 | D'Andreta | |
| D496,952 | S | 10/2004 | D'Andreta | |
| 2004/0258877 | A1 | 12/2004 | D'Andreta | |
| 2006/0015214 | A1 * | 1/2006 | Sugawara | .................. B25J 5/00 700/245 |
| 2006/0141200 | A1 | 6/2006 | D'Andreta | |

* cited by examiner

*Primary Examiner* — Dah-Wei D. Yuan
*Assistant Examiner* — Stephen A Kitt
(74) *Attorney, Agent, or Firm* — Stephen T. Olson; Harness, Dickey & Pierce, P.L.C.

(57) ABSTRACT

An arrangement for automated painting of an object includes a paint robot, a cover and a cover blocking member. The paint robot defines an axis joint about which a first portion rotates relative to a second portion. The cover covers at least a portion of the paint robot. The cover blocking member is in the form of a band carried by the paint robot and is positioned between the paint robot and the cover.

12 Claims, 4 Drawing Sheets

APPARATUS FOR PREVENTING A COVER FROM BEING DRAWN INTO AN AXIS JOINT OF A PAINT ROBOT AND RELATED METHOD

CROSS-REFERENCE TO RELATED APPLICATIONS

This application claims the benefit of U.S. Provisional Application No. 61/750,598 filed on Jan. 9, 2013. The entire disclosure of the above application is incorporated herein by reference.

FIELD

The present disclosure relates to the automated painting of motor vehicles and the like with paint robots. The present disclosure more particularly relates to an apparatus for preventing a cover for a paint robot from being drawn into an axis joint of the paint robot. The present disclosure also relates to a method for preventing a cover for a paint robot from being drawn into an axis joint of a paint robot.

BACKGROUND

This section provides background information related to the present disclosure which is not necessarily prior art.

Painted goods such as automobiles and the like conventionally utilize a dedicated paint area or paint room for the application of paint. The paint rooms are highly regulated to promote a quality paint finish. For example, most conventional clothing is prohibited due to the loose fibers which otherwise end up in the paint. Additionally, various lotions and other personal products are prohibited due to their adverse effect on the painting process.

In many applications, paint is applied to articles such as automobiles with automated paint robots. The robots advantageously eliminate human error, reduce labor and provide improved and repeatable quality. The application of paint with automated paint robots is necessarily associated with a degree of overspray. Some overspray of paint is required to ensure complete painting of the subject article.

It has heretofore been appreciated in the pertinent art that automated paint robots can be equipped with covers to both protect the robot and reduce paint defects. In this regard, the covers substantially shield the robots from paint overspray, thereby protecting the moving parts. Additionally, the covers prevent the accumulation of paint that may otherwise result in the dripping of paint on the subject article. The covers can be periodically discarded and replaced.

Ongoing objectives in the pertinent art include improved cover fit to facilitate freedom of robot movement. It is also an ongoing objective to reduce any interference between the cover and the operation of the paint robot.

SUMMARY

This section provides a general summary of the disclosure, and is not a comprehensive disclosure of its full scope or all of its features.

In accordance with one particular aspect, the present teachings provide an apparatus for preventing a cover from being drawn into an axis joint of a paint robot. The paint robot includes first and second portions rotatable relative to one another about the axis joint. The apparatus includes a cover blocking member in the form of a band. The apparatus further includes a mounting arrangement for fixedly securing the band to one of the first or second portions of the paint robot.

In accordance with another particular aspect, the present teachings provide an arrangement for automated painting of an object. The arrangement includes a paint robot, a cover and a cover blocking member. The paint robot defines an axis joint about which a first portion rotates relative to a second portion. The cover covers at least a portion of the paint robot. The cover blocking member is in the form of a band carried by the paint robot and is positioned between the paint robot and the cover.

In accordance with yet another particular aspect, the present teachings provide a method for preventing a cover from being drawn into an axis joint of a paint robot. The paint robot includes first and second portions rotatable relative to one another about an axis joint. The method includes providing a cover blocking member. The method additionally includes applying the cover blocking member about one of the first and second portions of the paint robot and securing the cover blocking member to the one of the first or second portions proximate the axis joint. The method further includes rotating the first and second portions relative to each other with the cover blocking member disposed between the cover and the axis joint.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

An example embodiment is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
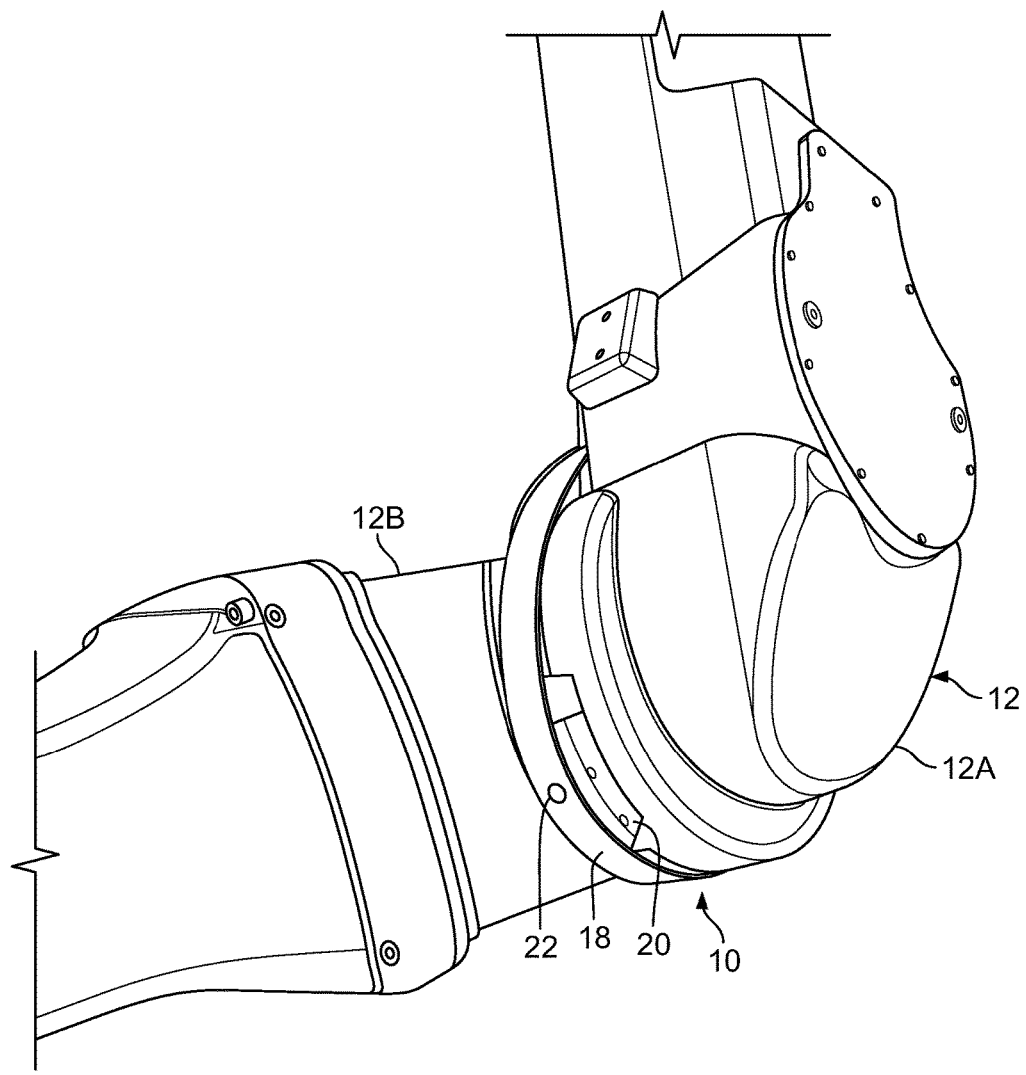
FIG. 1 is a perspective view of an apparatus according to the present teachings for preventing a cover from being drawn into an axis joint of the paint robot, the apparatus shown operatively associated with an exemplary paint robot.
Figure 2:
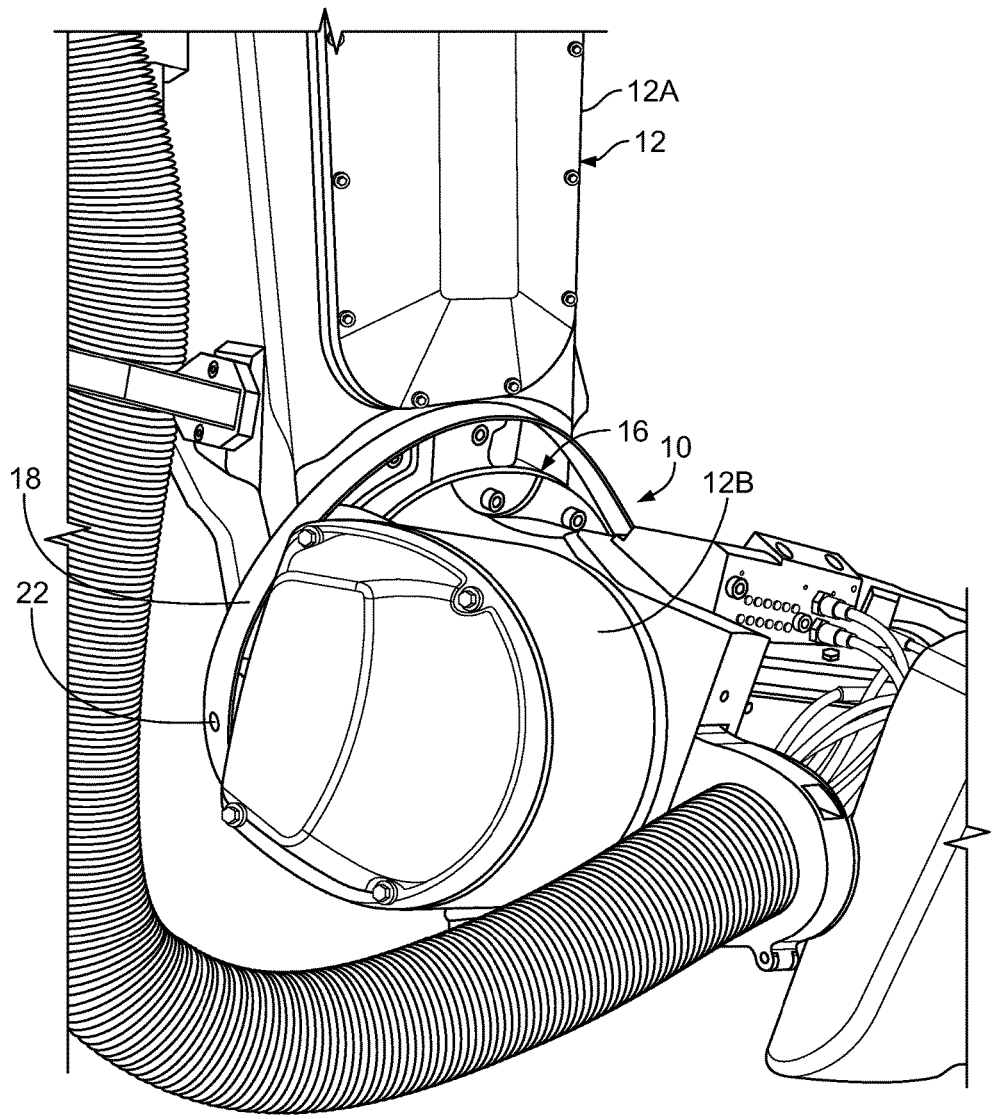
FIG. 2 is another perspective view of the apparatus for preventing a cover from being drawn into an axis joint of a paint robot of the present teachings and the exemplary paint robot.
Figure 3:
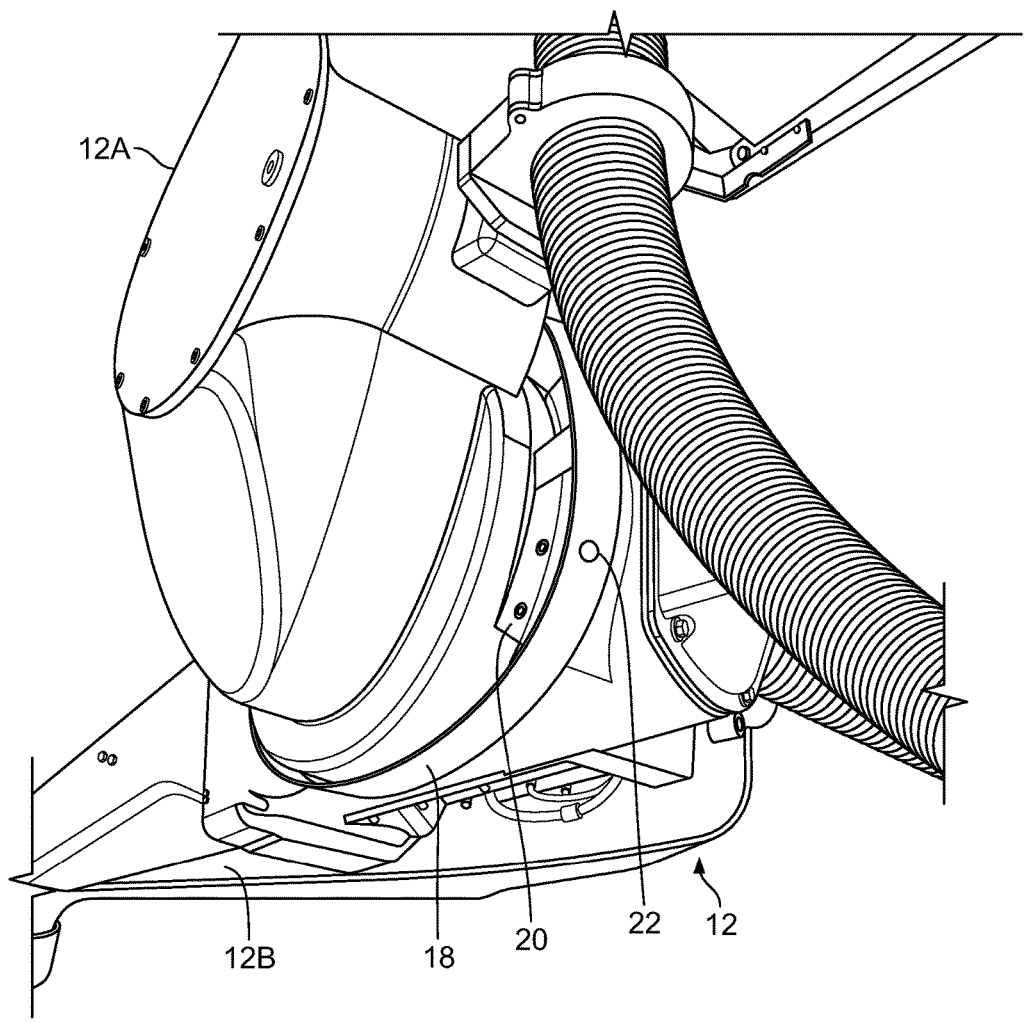
FIG. 3 is another perspective view of the apparatus for preventing a cover from being drawn into an axis joint of a paint robot of the present teachings and the exemplary paint robot.
Figure 4:
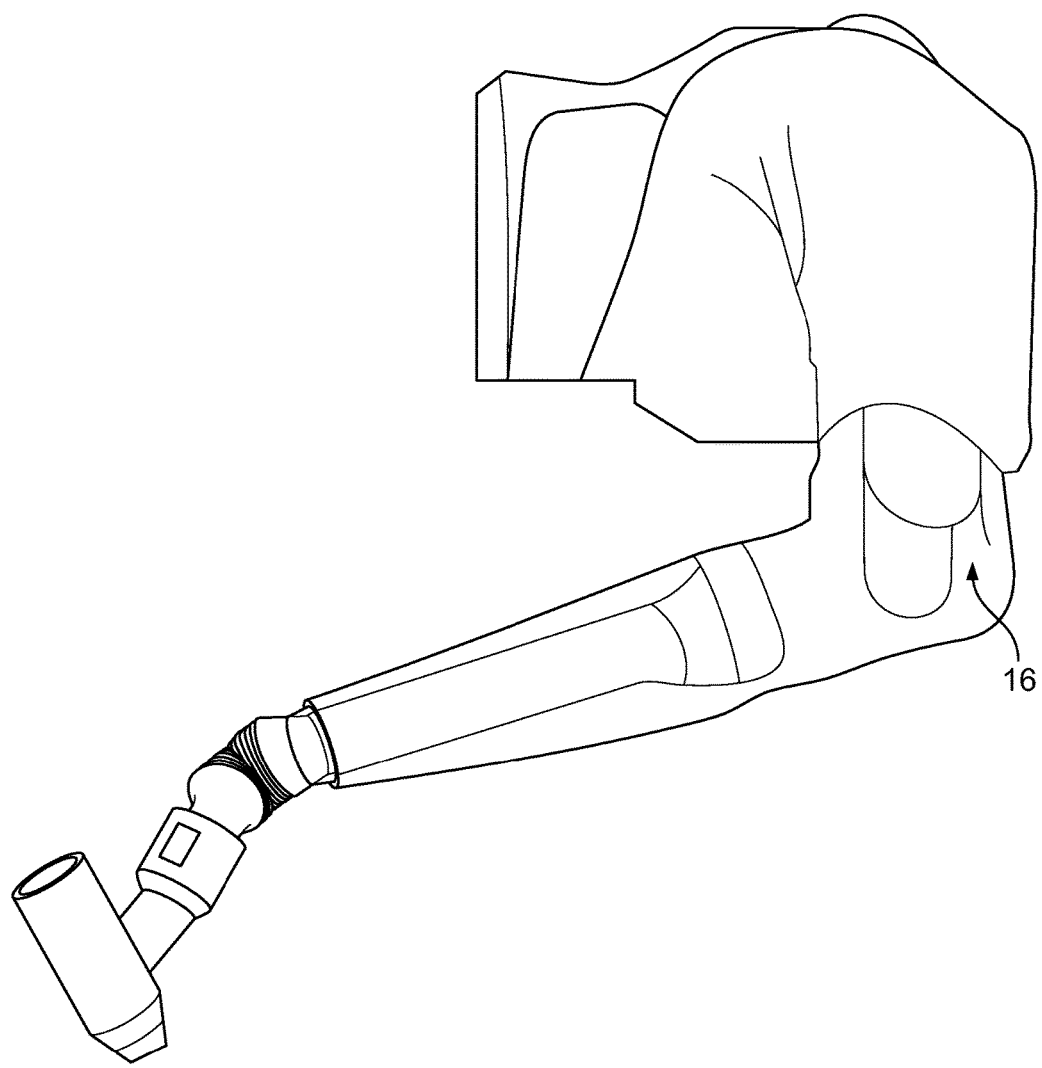
FIG. 4 is another perspective view of the apparatus for preventing a cover from being drawn into an axis joint of a paint robot of the present teachings and the exemplary paint robot, the exemplary paint cover.

With general reference to the drawings, an apparatus according to the present teachings for preventing the cover from being drawn into an axis joint of a robot is illustrated and generally identified at reference character 10. FIGS. 1-3 illustrate the apparatus 10 operatively attached to a paint robot 12. FIG. 4 illustrates the robot 12 of FIGS. 1-3 covered with a paint cover 14, the apparatus 10 of the present teachings covered by the robot 12 to prevent the cover 14 from being drawn into an axis joint 16 of the robot 12.

It will be understood that the robot 12 and paint cover 14 shown in the drawings are conventional in both construction and operation as far as the present teachings are concerned. It will be further understood that the present teachings may be adapted for use with various robots and covers.

The robot 12 conventionally functions to deliver a source of paint to an object such as a motor vehicle or the like. The robot 12 may be computer controlled to articulate as necessary for automated painting of the object. A terminal end of the paint robot 12 may carry a paint gun.

The paint robot 12 is capable of various movements for desired positioning of the paint gun relative to the object to be painted. Relevant to the apparatus of the present teachings, the paint robot 12 includes first and second portions 12A and 12B rotatable relative to one another. The first and second portions 12A and 12B rotate relative to one another at the axis joint 16.

The paint cover 14 covers at least a portion of the robot 12. As particularly illustrated in FIG. 4, the cover 14 substantially covers the robot 12 and protects the robot 12 from paint overspray. In the relevant art, it is important that the paint cover 14 shield the robot 12 from overspray without interfering with the various required movements of the robot. Generally speaking, a relatively snug fit of the cover 14 is desired to accomplish these objectives and to avoid material (i.e., paint) waste. Various paint covers are known in the relevant art, including but not limited to the paint covers shown and described in commonly owned U.S. Publication Nos. 2006/0141200; 2004/0258877; and U.S. Design Pat. No. D496,952; and 491,964. U.S. Publication Nos. 2006/0141200; 2004/0258877; and U.S. Design Pat. No. D496,952; and 491,964 are incorporated by reference as if fully set forth herein.

The apparatus 10 of the present teachings is generally illustrated to include a blocking member. The blocking member 18 may be a generally circular ring or a band. In the embodiment illustrated, the blocking member 18 defines a complete ring.

In one particular application, the blocking member or ring 18 is constructed from a generally flat stock material. As shown in the drawings, the stock material may be a flexible plastic and may have a length of about 48 inches and a width of about 1.5 inches. It will be understood, however, that the dimensions may be varied within the scope of the present teachings. In this regard, the length is significantly greater than the width. The ring 18 may be configured by bending the flat stock material and securing a first end thereof to a second end thereof. Such securement may be accomplished in any suitable manner well known in the art. For example, the two ends may be welded together or secured with a fastener. It will be appreciated by those skilled in the art that other materials may be readily employed and further that the identified dimensions may be readily changed for other applications.

The flat stock material defining the blocking member 18 may be wrapped about one of the first and second portions 12A and 12B of the paint robot 12 at the painting site. Thereafter, the blocking member 18 may be fixedly secured to the one of the first and second portions 12A and 12B of the paint robot 12. As illustrated, the blocking member 18 may be concentrically positioned relative to the one of the first and second portions 12A and 12B and spaced therefrom. The blocking member 18 is disposed between the axis joint 16 and the paint cover 14.

The apparatus 10 of the present teachings further includes a mounting arrangement for securing the blocking member 18 to the robot 12. As illustrated, the mounting arrangement may include one or more spacers 20. Each spacer 20 may be secured to the robot 12 with a fastener 22. The fastener 22 may in turn secure the blocking member 18 to the spacer 20. In the embodiment illustrated, the mounting arrangement includes a single fastener 22 and a single spacer 20. Additional fasteners 22 and spacers 20 may be incorporated within the scope of the present teachings. It will be appreciated by those of ordinary skill in the art that various applications may omit any spacers. In this regard, the blocking member 18 may be directly attached to the robot 12. These applications are within the scope of the present teachings.

The spacer 20 is positioned between the blocking member 18 and the robot 12 to establish a desired spacing therebetween. In the embodiment illustrated, the spacing between the blocking member 18 and the robot 12 is approximately 1.5-2.0 inches. The spacing between the blocking member 18 and the robot 12 may be uniform about the robot 12 but does not need to be. The fastener 22 passes through a hole in the spacer 20 and engages a threaded aperture in the robot 12. The blocking member 18 is sufficiently rigid relative to the cover 14 to prevent the cover 14 from being drawn into the axis joint 16.

The blocking member 18 may be carried by the first portion 12A of the robot 12 proximate the axis joint 16. In this regard, the blocking member 18 is axially positioned close to the second portion 12B of the robot 12 but slightly spaced from the second portion 12B so as to not interfere with relative rotation therebetween.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A paint robot comprising:
a first portion and a second portion, the first portion defining a first arm of the paint robot, the first arm elongated along a first length and having a first thickness perpendicular to the first length, the second portion defining a second arm of the paint robot, the second arm elongated along a second length and having a second thickness perpendicular to the second length, the first portion directly coupled to the second portion at a joint having an axis of rotation, the first portion elongated along a first longitudinal axis and the second portion elongated along a second longitudinal axis, the axis of rotation being perpendicular to both of the first and second longitudinal axes, the axis of rotation passing through the first and second thickness; and
a circular ring; and
a mounting arrangement non-rotatably securing the circular ring directly to one of the first and second portions of the paint robot proximate the joint,
wherein the axis of rotation of the joint extends through the circular ring, the circular ring surrounds the one of the first and second portions and is radially spaced from another of the first and second portions.

2. The apparatus of claim 1, wherein the ring defines a complete circle.

3. The paint robot of claim 1, in combination with a cover, wherein the circular ring is positioned between the paint robot and the cover.

4. The paint robot of claim 1, wherein the mounting arrangement includes at least one fastener passing through a hole in the circular ring and engaging the robot.

5. The paint robot of claim 1, wherein the at least one fastener engages a threaded aperture in the robot.

6. A paint robot of claim 1, wherein the circular ring is attached to and rotates with the first portion of the robot.

7. The paint robot of claim 1, in combination with a cover, the cover covering the joint and operative to shield the robot from paint overspray.

8. The paint robot of claim 1, wherein the circular ring is constructed of a flexible plastic material and secured to the one of the first and second portions with the at least one discrete fastener.

9. A paint robot comprising:
a first portion and a second portion, the first portion defining a first arm of the paint robot, the first arm elongated along a first length and having a first thickness perpendicular to the first length, the second portion defining a second arm of the paint robot, the second arm elongated along a second length and having a second thickness perpendicular to the second length, the first portion directly coupled to a second portion at a joint having an axis of rotation, the first portion elongated along a first longitudinal axis and the second portion elongated along a second longitudinal axis, the axis of rotation being perpendicular to both of the first and second longitudinal axes, the axis of rotation passing through the first and second thickness; and
a circular ring; and
at least one fastener securing the circular ring directly to one of the first and second portions of the paint robot proximate the joint, the at least one fastener passing through a hole in the circular ring and engaging the robot,
wherein the axis of rotation of the joint extends through the circular ring, the circular ring surrounds the one of the first and second portions and is radially spaced from an other of the first and second portions.

10. The paint robot of claim 9, wherein the at least one fastener engages a threaded aperture in the robot.

11. The paint robot of claim 9, in combination with a cover, the cover covering the joint and operative to shield the robot from paint overspray.

12. The paint robot of claim 9, wherein the circular ring is constructed of a flexible plastic material and secured to the one of the first and second portions with the at least one discrete fastener.

* * * * *